United States Patent [19]
Steiss

[11] Patent Number: 5,815,420
[45] Date of Patent: Sep. 29, 1998

[54] MICROPROCESSOR ARITHMETIC LOGIC UNIT USING MULTIPLE NUMBER REPRESENTATIONS

[75] Inventor: Donald E. Steiss, Richardson, Tex.

[73] Assignee: Texas Instruments Incorporated, Dallas, Tex.

[21] Appl. No.: 903,846

[22] Filed: Jul. 31, 1997

Related U.S. Application Data

[60] Provisional application No. 60/022,856 Jul. 31, 1996.
[51] Int. Cl.$^6$ ................................. G06F 7/38; G06F 7/00
[52] U.S. Cl. ................................. 364/736.04; 364/746.2; 364/716.02
[58] Field of Search ................... 364/716.02, 736.01, 364/736.04, 746.2

[56] References Cited

U.S. PATENT DOCUMENTS

| | | | |
|---|---|---|---|
| 4,890,127 | 12/1989 | Darley | 364/786 |
| 5,680,339 | 10/1997 | Moyse et al. | 364/746.2 |
| 5,696,954 | 12/1997 | Guttag et al. | 364/736.01 |

*Primary Examiner*—Tan V. Mai
*Attorney, Agent, or Firm*—Robert D. Marshall, Jr.; James C. Kesterson; Richard L. Donaldson

[57] ABSTRACT

A microprocessor (5) having at least one arithmetic logic unit, or ALU, (42) for operating upon operands of multiple number representation types is disclosed. The ALU (42) includes a binary logical unit (52) for performing logical operations upon operands in a binary representation, and an arithmetic unit (50, 50') for performing arithmetic operations upon operands in a redundant number representation. The redundant number representation is of a type that may be operated upon by adder circuitry such as signed-digit adders or carry-save adders, where carry information need not propagate along the entire operand. A register file (39, 39') is provided, which stores each operand in both the binary form and in the redundant number representation; a valid bit (V) is provided in combination with the binary portion of each entry in the register file (39, 39'). Upon execution of a logical operation, the result is written back into the register file (39, 39') in both the binary and redundant forms, setting the valid bit to indicate that the binary form is valid. Upon execution of an arithmetic instruction, the binary form of the result is not immediately available; the redundant representation of the result is written back, with the valid bit cleared. Conversion of the result in the redundant representation to the binary form may be done in the next machine or instruction cycle by conversion circuitry (60, 60').

19 Claims, 6 Drawing Sheets

FIG. 5a

| STAGE | | CYCLE | | |
|---|---|---|---|---|
| | | i | i+1 | i+2 |
| | EX | $R_2 \leftarrow R_1 + R_0$ | $R_3 \leftarrow R_2 + R_1$ | $R_4 \leftarrow R_3 + R_2$ |
| | WRITE DATA (SIGNED-DIGIT) | $R_1 + R_0$ | $R_2 + R_1$ | $R_3 + R_2$ |
| | WRITE DATA (BINARY) | | $R_1 + R_0$ | $R_2 + R_1$ |

FIG. 5b

| | CYCLE | | | |
|---|---|---|---|---|
| | i | i+1 | i+2 | i+3 |
| EX | $R_2 \leftarrow R_1 * R_0$ | $R_3 \leftarrow R_2 \oplus IM$ | $R_4 \leftarrow R_3 - R_1$ | |
| WRITE DATA (SIGNED-DIGIT) | $R_1 * R_0$ | $R_2 \oplus IM$ | $R_3 - R_1$ | |
| WRITE DATA (BINARY) | $R_1 * R_0$ | $R_2 \oplus IM$ | | $R_3 - R_1$ |

FIG. 5c

| | CYCLE | | |
|---|---|---|---|
| | i | i+1 | i+2 |
| EX | $R_2 \leftarrow R_1 + R_0$ | $R_3 \leftarrow R_2 * R_4$ | $R_3 \leftarrow R_2 * R_4$ |
| WRITE DATA (SIGNED-DIGIT) | $R_1 + R_0$ | | $R_2 * R_4$ |
| WRITE DATA (BINARY) | | $R_1 + R_0$ | $R_2 * R_4$ |

(STALL)

MICROPROCESSOR ARITHMETIC LOGIC UNIT USING MULTIPLE NUMBER REPRESENTATIONS

This application claims priority under 35 USC 119(e) (1) of the provisional application Ser. No. 60/022,856 filed Jul. 31, 1996.

This invention is in the field of microprocessor integrated circuits, and is more specifically directed to arithmetic logic units therein.

BACKGROUND OF THE INVENTION

As is well known in the art, microprocessors have made significant advances in performance over recent years. Some performance improvements are due to improvements in manufacturing technology which have enabled the fabrication of smaller and faster transistors, and which have improved the density with which conductors may be implemented into the microprocessor integrated circuit. Performance improvements are also due in large part to advances in microprocessor architecture, particularly in achieving rapid execution and communication of digital operands internally within the microprocessor.

A primary execution unit, or execution circuit, that is present in virtually all modern microprocessors is commonly referred to as the arithmetic logic unit, or ALU. This circuit block is generally called upon to perform arithmetic operations, such as addition and subtraction, upon digital data words, and to also perform logical operations, such as ANDs, ORs, exclusive-ORs, and combinations thereof, also upon these digital data words. Considering that the performance of a microprocessor is generally measured by the number of instructions that can be executed over time, and also considering that operations performed by one or more ALUs of the microprocessor are generally involved in the execution of program instructions, it is of course well known to those in the art that ALU throughput is a significant factor in the overall performance of the microprocessor.

The addition and subtraction of digital data words, when expressed in a purely binary form, can limit the operating frequency of a microprocessor. This is because of the necessity for carry information to propagate along the length of the operand, in the worst case all the way from the least-significant bit position to the most-significant bit position. The simplest adder, commonly referred to as a ripple-carry adder, requires on the order of n levels of logic to add two n-bit operands that are expressed in binary form, and typical advanced adder designs require on the order of $\log_2(n)$ levels of logic for this addition.

Due to the criticality of the performance of the ALU in overall microprocessor performance, other adder designs have been developed in order to reduce the number of logic levels and thus the propagation delay in the ALU. These alternative adder designs typically require alternative number representations for the operands in order to reduce the number of logic levels in the adder. Of course, as is known in the art, the adder circuit may also be used to perform subtractions (by inverting one of the addends), and also to perform integer multiplication.

One example of such an alternative adder design uses the so-called signed-digit number representation, also referred to as the sign-magnitude representation. In this case, each bit position is represented by a sign bit and a magnitude bit. The signed-digit adder, as is well known in the art, in turn generates a sign bit and a magnitude bit for each bit position from the inputs, and does not require propagation or ripple of the carry beyond the adjacent stage. An example of a signed-digit adder is described in U.S. Pat. No. 4,890,127, issued Dec. 26, 1989, commonly assigned herewith and incorporated herein by this reference.

Another alternative approach to implementation of adder stages is the carry-save adder (CSA). In this approach, each bit position in each addend is represented not by a single binary digit (as in the carry-ripple case) but by a sum and carry bit. As such, carry-save adders are often used in an accumulator, where each addition is expressed as the sum of the current accumulator plus an operand, with the result stored back into the accumulator. Each stage of the carry-save adder (a stage being associated with a bit position) receives at least three inputs, including the sum bits from each addend for that bit position and the carry bit from the immediately adjacent lower order bit position (typically from the prior state of the accumulator); the carry-save adder then produces sum and carry bits for each bit position. These sum and carry bits are saved for each output bit position, and as such only two levels of logic are required to implement the carry-save adder.

Both of the signed-digit and carry-save number representations, as well as other representations, may be considered as "redundant" number representations, as there may be multiple encodings of the same binary value. This property is critical for developing adders without carry propagation. While the addition and subtraction of numbers represented in redundant form may be performed rapidly, additional register space is required considering that each bit position is represented by at least two bits, rather than by a single bit as in the binary representation.

Of course, logical operations may be performed rapidly upon digital words in binary form. However, logical operations may not be directly performed upon digital words representing numbers in a redundant form, as the binary values are not directly represented therein. As a result, it is inefficient to represent numbers in a redundant representation for ALUs that are required to perform both logical and arithmetic operations.

SUMMARY OF THE INVENTION

The invention may be implemented into an arithmetic logic unit (ALU) of a microprocessor in combination with its register file. Each entry in the register file includes a first location for storing a redundant representation of an operand, and a second location for storing a binary representation of the same operand; a valid bit is included for indicating whether the binary representation of the operand is valid. The ALU includes a logical unit for receiving and performing logical operations upon the binary representations of the register operands, and an arithmetic unit for performing additive operations (i.e., addition and subtraction) upon the redundant representation of register operands and generating a result that is also in redundant format. Either the arithmetic or logical unit is enabled, depending upon the instruction being executed. Upon execution of a logical instruction, both binary and redundant representations of the result are written back into the register file. For arithmetic instructions, only the redundant representation of the result is immediately available; additional circuitry is provided to convert the result into a binary representation. The valid bit for the binary representation is set in the destination register entry only at such time as conversion of the result into the binary representation is complete and the binary result written back.

It is an object of the present invention to provide an ALU in which most instructions and combinations of instructions may be executed with minimal levels of logic, and thus with minimum propagation delay.

It is a further object of the present invention to provide such an ALU in which only relatively rare combinations of instructions result in extended propagation delay.

It is a further object of the present invention to provide such an ALU that is suitable for use in high performance microprocessors.

Other objects and advantages of the present invention will be apparent to those of ordinary skill in the art having reference to the following specification together with its drawings.

BRIEF DESCRIPTION OF THE DRAWINGS

FIG. 5a is a pipeline flow diagram illustrating the operation of the arithmetic logic unit of FIG. 3 in a first pipeline situation.

FIG. 5b is a pipeline flow diagram illustrating the operation of the arithmetic logic unit of FIG. 3 in a second pipeline situation.

FIG. 5c is a pipeline flow diagram illustrating the operation of the arithmetic logic unit of FIG. 3 in a third pipeline situation.

DETAILED DESCRIPTION OF THE PREFERRED EMBODIMENTS

Figure 1:
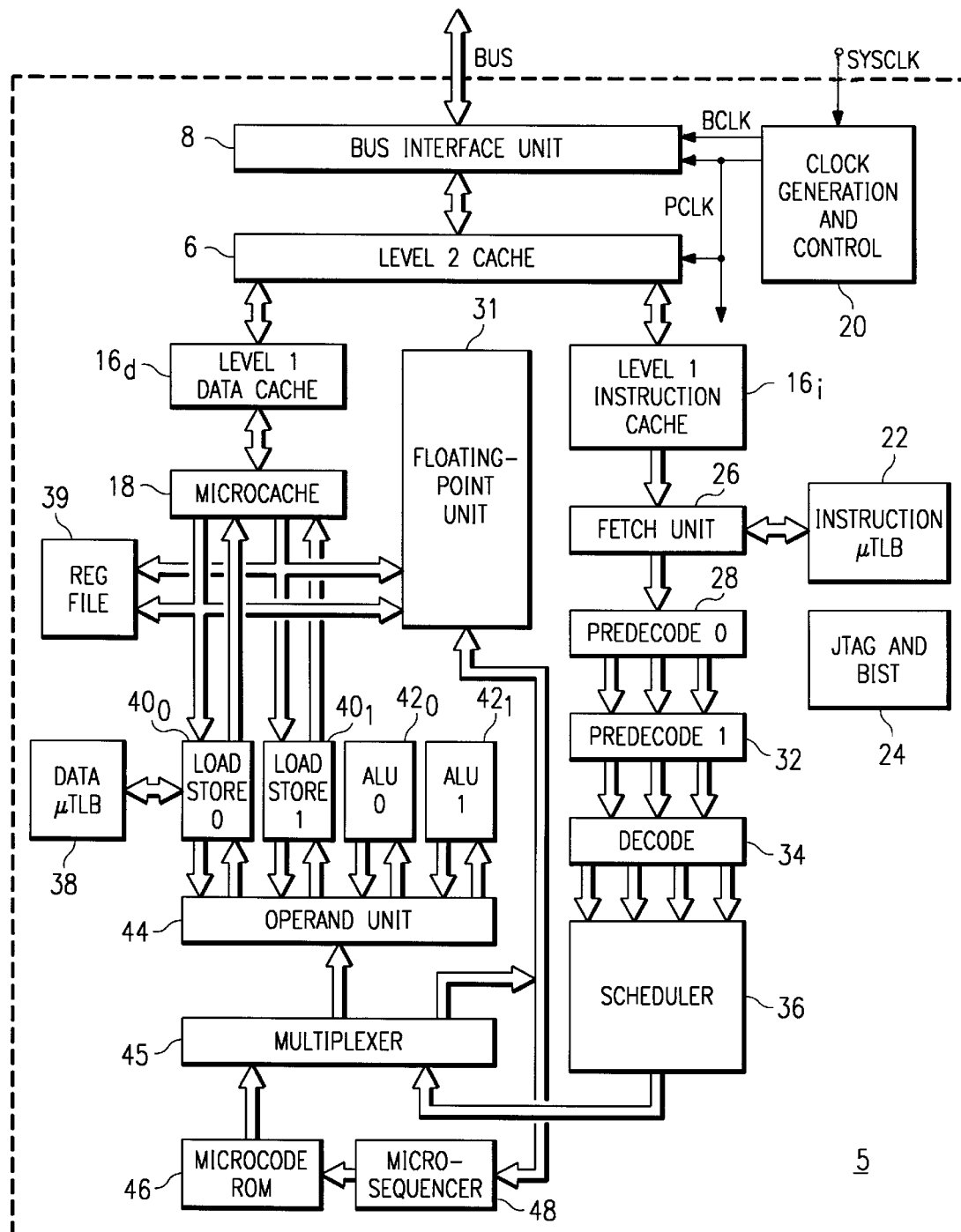
FIG. 1 is an electrical diagram, in block form, of a microprocessor constructed according to the preferred embodiment of the invention.

Referring now to FIG. 1, microprocessor 5 according to the preferred embodiment of the invention is illustrated in block diagram form, and will now be described. Microprocessor 5 includes bus interface unit (BIU) 8 connected to external bus BUS, which controls and effects communication between microprocessor 5 and the other elements in a microprocessor-based system, such as memory, input/output functions, disk storage, and the like. BIU 8 includes the appropriate control and clock circuitry to perform this function, including write buffers for increasing the speed of operation, and including timing circuitry so as to synchronize the results of internal microprocessor operation with bus BUS timing constraints. Microprocessor 5 also includes clock generation and control circuitry 20 which, in this example, generates clock phases based upon system clock SYSCLK.

As is evident in FIG. 1, microprocessor 5 has three levels of internal cache memory, with the highest of these as level 2 cache 6, which is connected to BIU 8 by way of an internal bus. In this example, level 2 cache 6 is a unified cache, and is configured to receive all cacheable data and cacheable instructions from bus BUS via BIU 8, such that much of the bus traffic presented by microprocessor 5 is accomplished via level 2 cache 6. Of course, microprocessor 5 may also effect bus traffic around cache 6, by treating certain bus reads and writes as "not cacheable". Level 2 cache 6, as shown in FIG. 1, is connected to two level 1 caches 16; level 1 data cache $16_d$ is dedicated to data, while level 1 instruction cache $16_i$ is dedicated to instructions. Microcache 18 is a fully dual-ported level 0 data cache, in this example.

As shown in FIG. 1, microprocessor 5 is of the superscalar type, and thus includes multiple execution units. These execution units include two ALUs $42_0$, $42_1$, for processing conditional branch, integer, and logical operations, floating-point unit (FPU) 31, two load-store units $40_0$, $40_1$, and microsequencer 48. The two load-store units 40 utilize the two ports to microcache 18, for true parallel access thereto, and also perform load and store operations to registers in register file 39. Data microtranslation lookaside buffer ($\mu$TLB) 38 is provided to translate logical data addresses into physical addresses, in the conventional manner.

These multiple execution units are controlled by way of multiple pipelines of seven stages each, with write-back. The pipeline stages are as follows:

| | |
|---|---|
| F | Fetch: This stage generates the instruction address and reads the instruction from the instruction cache or memory |
| PD0 | Predecode stage 0: This stage determines the length and starting position of up to three fetched x86-type instructions |
| PD1 | Predecode stage 1: This stage extracts the x86 instruction bytes and recodes them into fixed length format for decode |
| DC | Decode: This stage translates the x86 instructions into atomic operations (AOps) |
| SC | Schedule: This stage assigns up to four AOps to the appropriate execution units (including FPU 31) |
| OP | Operand: This stage retrieves the register operands indicated by the AOps |
| EX | Execute: This stage runs the execution units according to the AOps and the retrieved operands |
| WB | Write-back: This stage stores the results of the execution in registers or in memory |

Referring back to FIG. 1, the pipeline stages noted above are performed by various functional blocks within microprocessor 5. Fetch unit 26 generates instruction addresses from the instruction pointer by way of instruction microtranslation lookaside buffer ($\mu$TLB) 22, for application to level 1 instruction cache $16_i$. Instruction cache $16_i$ produces a stream of instruction data to fetch unit 26, which in turn provides the instruction code to predecode 0 stage 28 and predecode 1 stage 32 in the desired sequence. These two stages operate as separate pipeline stages, and together operate to locate up to three x86 instructions and apply the same to decoder 34. Predecode 0 stage 28 determines the size and position of as many as three variable-length x86 instructions, while predecode 1 stage 32 recodes the multi-byte instructions into a fixed-length format to facilitate decoding. Decode unit 34, in this example, contains four instruction decoders, each capable of receiving a fixed length x86 instruction from predecode 1 stage 32 and producing from one to three atomic operations (AOps), which are substantially equivalent to RISC instructions. Scheduler 36 reads up to four AOps from the decode queue at the output of decode unit 34, and assigns these AOps to the appropriate execution units. Operand unit 44 receives an input from scheduler 36 and also from microcode ROM 46, via multiplexer 45, and fetches register operands for use in the execution of the instructions. In addition, according to this example, operand unit 44 also performs operand forwarding to send results to registers that are ready to be stored, and also performs address generation for AOps of the load and store type.

Microsequencer 48 and microcode ROM 46 control ALUs 42 and load/store units 40 in the execution of microcode entry AOps, which are generally the last AOps to execute in a cycle. In this example, microsequencer 48 sequences through microinstructions stored in microcode ROM 46, to effect control responsive to microcoded microinstructions such as complex or rarely-used x86 instructions, x86 instructions that modify segment or control registers, handling of exceptions and interrupts, and multi-cycle instructions (such as REP instructions, and instructions that PUSH and POP all registers).

Microprocessor 5 also includes circuitry 24 for controlling the operation of JTAG scan testing, and of certain built-in self-test (BIST) functions, ensuring the validity of the operation of microprocessor 5 upon completion of manufacturing, and upon resets and other events.

Figure 2A:
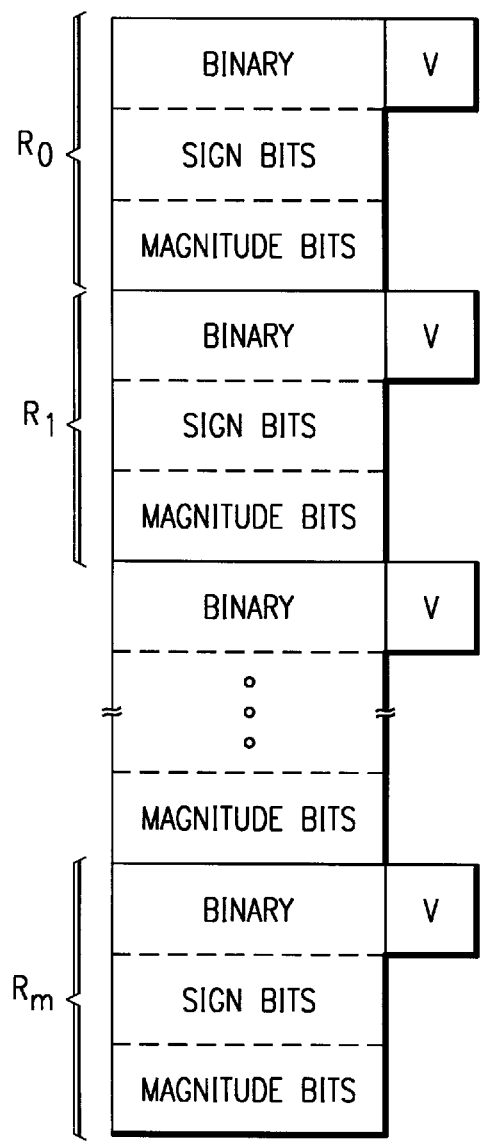
FIG. 2a is a diagram illustrating the contents of a register file according to the first preferred embodiment of the invention.

Referring now to FIG. 2a, the construction of register file 39 according to a first embodiment of the invention will now be described in detail. According to the present invention, multiple representations of each operand are stored in register file 39, allowing instructions of different types, such as arithmetic and logical instructions, to operate upon operands that are represented in an efficient format for that instruction type. As is fundamental in the art, logical instructions, such as logical AND, OR, XOR and the like, are efficiently performed upon conventional binary operands, as each bit in the result depends only upon a logical combination of the same bit position in each of the operands. Arithmetic instructions, particularly additive instructions (i.e., addition and subtraction), are not as efficiently performed when applied to binary representations, due to the possibility of carry information propagating along the full length of the operands (e.g., in the case of a ripple-carry adder). Alternative digital number representations have been developed that permit efficient arithmetic processing, by eliminating the need for carry information to propagate along the full length of the operand; instead, each bit in the result may depend upon, at most, results from one adjacent bit position, thus resulting in "carry-free" addition. These alternative representations generally require two bits of storage for each operand bit position, and thus are often referred to as "redundant" representations. Examples of such redundant representations include signed-digit, carry-save, and carry-propagate number representations.

According to this first embodiment of the invention, each operand stored in an entry R of register file 39 shown in FIG. 2a will be represented in both a binary form and a signed-digit (also referred to as signed-magnitude) form. The binary form is, of course, the conventional representation of digital data, in which an binary (i.e., base 2) number is represented as a signed integer, with a single sign bit generally residing in the most significant bit position. In the case of an n-bit data word (allowing for n−1 magnitude bits and one sign bit), a binary number ranging in value from 0 to $2^{(n-1)}-1$ may be expressed. According to the signed-digit number representation, the same digital number as represented by the n-bit binary representation is represented by 2n bits. The signed magnitude representation has 2 bits for every binary bit position, one bit being a sign bit (non-negative numbers represented by 0, negative numbers by 1) and the other a magnitude bit (0 and 1). Negative 0 (i.e., sign bit of 1 and magnitude bit of 0) is not defined as a bit value.

As is well known in the art, the signed-digit number representation is useful in the addition and subtraction of digital numbers in a manner which does not require the rippling of carry information along the bit positions. Such adders are commonly referred to as signed-digit adders. An example of a signed-digit adder is described in U.S. Pat. No. 4,890,127, assigned to Texas Instruments Incorporated and incorporated herein by this reference. As described in this patent, the addition of two digital operands in signed-digit form may be done in a "carry-free" manner, in that information is not generated in any one stage of the adder which affects the result in more than one adjoining stage. The signed-digit adder therefore provides a high level of performance, particularly in situations such as multiplication where multiple additions are performed in sequence. The signed-digit representation becomes especially useful in modern microprocessors handling 32-bit operands, where carry chains must be avoided to obtain even reasonable performance.

As shown in FIG. 2a for this embodiment of the invention, register file 39 includes entries $R_0$ through $R_m$, storing m operands, each operand stored in binary and signed-digit form. For example, register file entry $R_0$ has a binary portion, a sign bit portion, and a magnitude bit portion, as do the other entries $R_1$ through $R_m$ in register file 39 according to this embodiment of the invention. The binary portion of each entry R in register file 39 is associated with valid bit V. Valid bit V is set, in this embodiment of the invention, when the binary value in the binary portion of the entry R corresponds to the operand stored in the sign and magnitude bit portion of the entry R. As will be evident from the following description, the signed-digit representation of the operand will be made available upon completion of an arithmetic operation, before its corresponding binary representation becomes available, thus necessitating the use of the valid bit V to indicate when the binary representation is valid.

Figure 3:
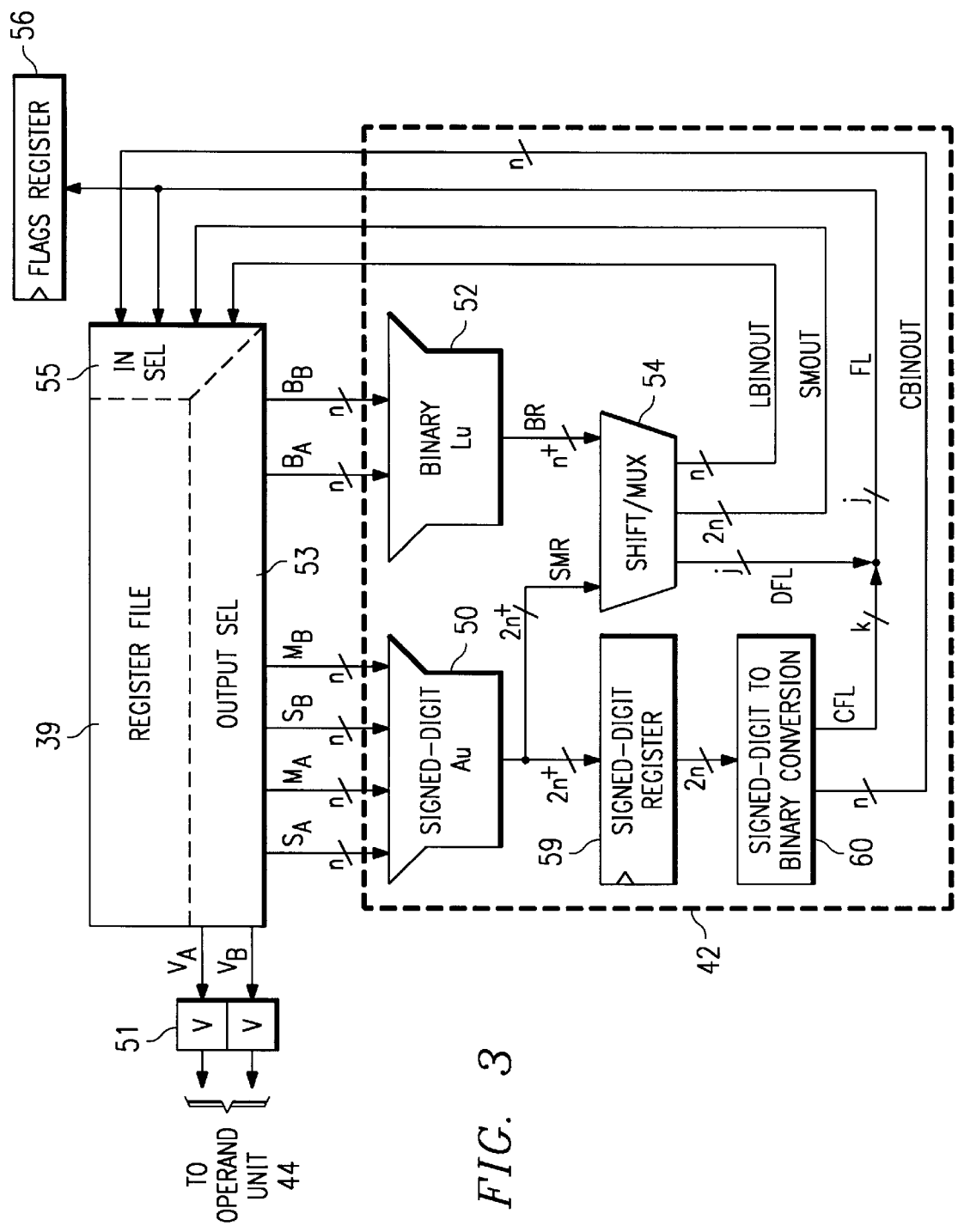
FIG. 3 is an electrical diagram, in block form, of an arithmetic logic unit according to the first preferred embodiment of the invention.

Referring now to FIG. 3, the construction of one of ALUs 42 in combination with register file 39 according to the preferred embodiment of the invention will now be described in detail. It is of course contemplated that both of ALUs 42 in microprocessor 5 will be similarly constructed as that shown in FIG. 3, according to the preferred embodiment of the invention.

As evident in FIG. 3, register file 39 includes conventional circuitry by way of which a selected entry R therein may be written or read; FIG. 3 illustrates this circuitry by way of output select circuitry 53 and input select circuitry 55. Output select circuitry 53 may be implemented by a set of multiplexers for selecting specific entries in register file 39 for use as operands A and B, according to the particular instruction to be executed. Output select circuitry 53 applies the state of valid bits V for the selected operands A and B to lines $V_A$, $V_B$, respectively, for buffering in buffer 51. Operand unit 44 will interrogate the state of valid bits V for the operands, upon the execution of each logical instruction, and will control the operation of ALU 42 accordingly, as will be described in detail hereinbelow. The binary portions of the selected entries for operands A, B in register file 39 are applied by output select circuitry 53 to buses $B_A$, $B_B$, respectively. Output select circuitry 53 also applies the corresponding sign bit portions of the entries R in register file 39 selected for operands A, B to buses $S_A$, $S_B$, and applies the corresponding magnitude bit portions of the entries R in register file 39 selected for operands A, B to buses $M_A$, $M_B$.

ALU 42 according to this preferred embodiment of the invention includes execution circuitry for selectably operating upon either the binary or signed-digit representations of operands A and B. In this example, binary logical unit 52 receives the binary number representations of operands A and B on buses $B_A$, $B_B$, and is implemented as conventional logic circuitry for performing logical operations (e.g., AND, OR, NOR, NAND, XOR, shifts, and rotates) thereupon. Control signals from instruction decoder 34 and scheduler 36 control binary logical unit 52 to effect the desired logical operation corresponding to the current decoded instruction of a logical type. Binary logical unit 52 presents the results of its operation on bus BR, which has the same number of lines (i.e., n) as bit positions in operands A and B, plus additional lines for communicating flags information regarding the result of the instruction.

ALU 42 also includes signed-digit arithmetic unit 50, which receives the signed-digit number representation of operand A on buses $S_A$, $M_A$ and the signed-digit number representation of operand B in register file to buses $S_B$, $M_B$, when these operands are fetched in connection with an arithmetic instruction. Signed-digit arithmetic unit 50 may be implemented using conventional circuitry for performing additive operations (i.e., additions and subtractions) upon the signed-digit representations of operands A and B, in a carry-free manner, as carry information need not ripple along the entire length of the operand. An example of a conventional signed-digit arithmetic unit 50 is described in the above-incorporated U.S. Pat. No. 4,890,127. Control signals from instruction decoder 34 and scheduler 36 control signed-digit arithmetic unit 50 to effect the desired operation of the decoded arithmetic instruction, and to present the results of this operation on bus SMR. In this example, where operands A and B are each represented in n bit positions (each bit position having a sign bit and a magnitude bit, as noted above), bus SMR will have at least 2n lines for communicating the digital result of the operation, plus flags information.

ALU 42 includes shifter/multiplexer 54, which receives binary results from binary logical unit 52 on bus BR and signed-digit results from signed-digit arithmetic unit 50 on bus SMR. It is contemplated that shifter/multiplexer 54 may be readily constructed by one of ordinary skill in the art having reference to the functional description provided herein, and as such shifter/multiplexer 54 is shown in block form in FIG. 3. As noted above, binary logical unit 52 and signed-digit arithmetic unit 50 are redundant, in that each are available for performing an operation upon the same operands A, B, but using different number representations. Shifter/multiplexer 54 selects the results from the appropriate one of binary logical unit 52 and signed-digit arithmetic unit 50 for the instruction (i.e., the results on bus BR will be selected if the instruction was a logical instruction, while the results on bus SMR will be selected for arithmetic instructions), and performs any necessary shifts upon these results.

For logical operations, the selected results on bus BR are applied to bus LBINOUT and forwarded to input select circuitry 55 of register file 39 for storage in the destination register indicated by the instruction. In this case, since the signed-digit representation of a binary result is merely a copy of the binary result in the magnitude bits with all sign bits set to zero, shifter/multiplexer 54 presents such a copy of these results onto bus SMOUT and thus to input select circuitry 55 of register file 39. Flags information is separated by shifter/multiplexer 54 and presented upon buses DFL and FL to flags register 56 and to input select circuitry 55 of register file 39. For logical operations, the flags information includes a signal to set the valid bit V of the destination register in register file 39 for the corresponding binary portion, indicating that the binary portion of the destination register contents are valid.

Conversely, shifter/multiplexer 54 selects results bus SMR for arithmetic instructions. In this event, bus SMOUT is driven with the results from signed-digit arithmetic unit 50, in signed-digit form. According to this embodiment of the invention, no corresponding binary representation has been generated, and as such the state of bus LBINOUT is not valid. Bus FL will, in this case, include a signal to clear the valid bit V of the destination register entry R in register file 39 upon writeback of the signed-digit results, to indicate that the value in its binary portion is not valid.

ALU 42 also includes circuitry for converting the signed-digit result from signed-digit arithmetic unit 50 into binary form. In this regard, signed-digit result register 59 receives output bus SMR from signed-digit arithmetic unit 50, storing these results for the next instruction cycle and thus allowing signed-digit arithmetic unit 50 to execute the next instruction in the pipeline. Signed-digit result register 59 presents its content, in the next cycle, to conversion circuitry 60. Conversion circuitry 60 includes conventional circuitry for converting the signed-digit representation of the results generated by signed-digit arithmetic unit 50 into binary form, and presents the binary representation on bus CBINOUT which is forwarded to input select circuitry 55 of register file 39. Flags information (including a signal to set the valid bit V of the destination register in register file 39) is forwarded by conversion circuitry 60 on bus CFL, and then bus FL, also to input select circuitry 55 of register file 39. In this way, register file 39 can update the binary portion of that destination register entry R to which the signed-digit arithmetic result was previously written, with the converted binary representation.

The operation of ALU 42 in executing a sequence of instructions will now be described in detail relative to FIG. 5. As will be evident from the following, the availability of both the binary and signed-digit number representations for the operands allows arithmetic processing to be performed in a carry-free manner, while still permitting rapid binary logical operations. Conversion from one format to another is performed, according to this preferred embodiment of the invention, only in the case of converting a signed-digit result into binary. It has been observed, in connection with the present invention, that the combination of an arithmetic instruction followed immediately by a logical operation upon the results is a rare occurrence; as such, according to the preferred embodiment of the invention, this conversion is performed in later instruction cycles, rather than in the critical execution path. The overall performance of the arithmetic-logic unit according to the present invention is thus improved over conventional architectures.

Figure 4:
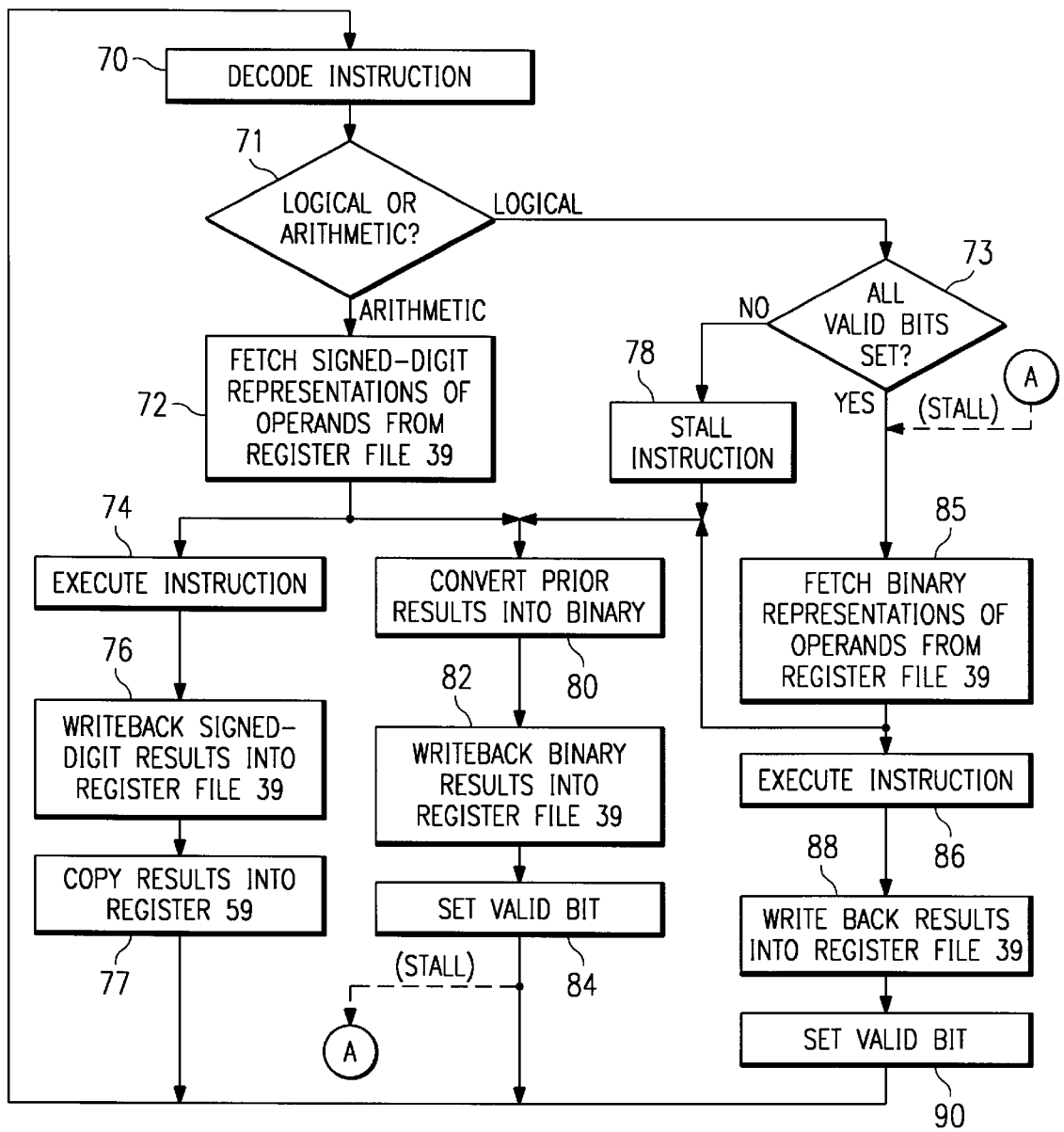
FIG. 4 is a flow chart illustrating the operation of the arithmetic logic unit of FIG. 3.

Referring now to FIG. 4, the operation of ALU 42 in combination with register file 39 according to this preferred embodiment of the invention will now be described in detail, by following a specific instruction through the execution stages of the pipeline. As discussed above relative to FIG. 1, microprocessor 5 is constructed according to a pipelined architecture; while not shown in FIG. 4, other instructions will be simultaneously progressing through the pipeline at different stages. In addition, microprocessor 5 is of the superscalar type, in which parallel instructions are issued and executed; these parallel instructions are not illustrated in FIG. 4, for purposes of clarity. As shown in FIG. 4, the method of operation begins with process 70, in which the current instruction is decoded by instruction decoder 34. Decision 71 is then performed by scheduler 36, responsive to the decoding of process 70, to determine whether the decoded instruction is an arithmetic or a logical instruction. As will be apparent from the following description, arithmetic and logical instructions are handled in different ways according to this embodiment of the invention.

If the decoded instruction is of the arithmetic type, process 72 is next performed by register file 39 fetching the redundant representations of operands for application to ALU 42. In this example, as noted above, register file 39 contains sign bit and magnitude bit portions in connection with each of its entries R, for use in arithmetic operations. Accordingly, in process 72, the entries R in register file 39 corresponding to the operands involved in the decoded arithmetic instruction are fetched from the appropriate entries R in register file 39, and communicated to signed-digit arithmetic unit 50 on buses $S_A$, $M_A$, $S_B$, $M_B$, respectively. It should be noted that the valid bits V associated with the binary portions of these entries R in register file 39 are not tested at this time. Since it was determined in decision 71 that the current instruction is of the arithmetic type, the binary representations of the operands are unnecessary for this instruction, and therefore, it is unimportant as to whether the binary representations are stored, obviating the need to interrogate their valid bits V.

Once the redundant (i.e., signed-digit) representations of the operands are fetched in process 72, process 74 is performed by signed-digit arithmetic unit 50 in ALU 42 to execute the arithmetic instruction. Process 76 is then also performed to writeback the carry-free result of the execution of process 74 (i.e., the results on bus SMR at the output of signed-digit arithmetic unit 50) to the destination register entry R of register file 39 specified in the instruction, via shifter/multiplexer 54 and bus SMOUT. At this time, a binary representation of these results is not available; as such, flags information on lines DFL are forwarded to input select circuitry 55 of register file 39, clearing valid bit V for the corresponding binary portion of the destination entry R to indicate that a valid binary representation of the arithmetic results is not yet available in register file 39. In process 77, a copy of these results is stored in signed-digit results register 59, for conversion into a binary representation in the next machine cycle. Execution and writeback processes 74, 76 are preferably performed in the same machine, or instruction, cycle; this high speed operation is enabled by the ability of signed-digit arithmetic unit 50 to be carry-free, eliminating the propagation delay of carry information along the entire operand.

According to the preferred embodiment of the invention, any results from the preceding instruction that were stored in signed-digit result register 59 are converted into binary by conversion circuitry 60 in process 80, simultaneously and in the same cycle as execution process 74. Following conversion process 80, the converted binary results are presented onto bus CBINOUT, and written into the binary portion of the appropriate register entry R (i.e., the destination register of the previous instruction) of register file 39 by its input select circuitry 55, in process 82. The valid bit V is set in process 84 for this entry R. Following the cycle in which writeback processes 76, 82, 84 complete, control passes back to process 70 to decode the next instruction in the pipeline.

Referring back to decision 71, if a logical instruction is detected from decode process 70, decision 73 is performed by operand unit 44 to interrogate the status of the valid bits V for the register entries R to be used as operands for the decoded instruction. As noted above, the valid bit V indicates, when set, that the binary portion of its entry R contains a valid entry, valid in the sense that it corresponds to the contents of the signed-digit representation stored in the sign bit and magnitude bit portions of entry R. Since the decoded instruction is a logical instruction in this case, the binary representations of the operands will be required by binary logical unit 52. However, since the binary representation of a preceding arithmetic instruction may not yet be available, operand unit 44 performs the testing of valid bits V in decision 73 to ensure proper operation.

In the event that one or more of valid bits V for the operands stored in register file 39 is not set (i.e., decision 73 is NO), operand unit 44 stalls the pipeline in process 78, and does not issue the instruction decoded in process 70 for execution. According to this embodiment of the invention, a clear valid bit V indicates that the desired binary operand is the result of a preceding arithmetic instruction, and that the decoded logical instruction must wait for the conversion of the signed-digit representation of these results into binary. Control then passes to process 80, in which the signed-digit results of the prior instruction are converted into binary form, written back to register file 39 in process 82, and its valid bit V set in process 84. In this case, where the results of the prior instruction were not yet available in binary form, the valid bit V for this entry was set by process 84; operand unit 44 will then initiate operand fetch process 85.

In process 85, the binary representations of the operands are fetched from register file 39, and forwarded to binary logical unit 52 for execution in process 86. Binary logical unit 52 executes the decoded instruction in process 86. The binary and signed-digit results (the signed-digit case being merely a copy of the binary results in the magnitude portion with all sign bits cleared) are then written back into register file 39 in process 88, and the valid bit V set for the binary portion of the destination entry R in process 90.

As in the case of the execution of an arithmetic instruction, any prior arithmetic results stored in signed-digit result register 59 at the time of execution process 86 are converted by conversion circuitry 60 (process 80) and written back (processes 82, 84) in the same cycle as execution and writeback processes 86, 88, 90. Of course, if a stall was initiated in process 78 for the current instruction, no such results will be converted upon execution of that instruction.

Upon completion of writeback processes 88, 90 (and processes 82, 84 if performed), control passes back to decode process 70 for the next instruction in program order. Of course, it is contemplated that the present invention is applicable to pipelined architectures, as described hereinabove for microprocessor 5; in such a case, decode process 70 will have been initiated for a later instruction upon the issuance of the current instruction to the execution units.

Referring now to FIGS. 5a through 5c, the pipelined operation of ALU 42 according to this preferred embodiment of the invention will now be described in detail. Reference to particular processes in FIG. 4 will be made parenthetically in this description, for ease of correlation. FIGS. 5a through 5c are pipeline stage diagrams, illustrating the contents of the execution and register file writeback (for both the signed-digit and binary representations) stages of the pipeline for various combinations of arithmetic and logical instructions to be executed by ALU 42. Preceding stages (including such stages as fetch, decode, scheduling, and the like) will of course be present in the operation, but are not shown in FIGS. 5a through 5c for purposes of clarity.

In the example of FIG. 5a, the sequence of instructions executed are three successive additive instructions. The nomenclature of FIG. 5a indicates the destination register in register file 39 on the left side of the arrow, with the source registers of register file 39 on the right side of the arrow. In cycle i of the code fragment of FIG. 5a, ALU 42 of FIG. 3 fetches the contents of register entry $R_0$ and $R_1$ from register file 39 (process 72 of FIG. 4), and executes the addition of these contents using signed-digit arithmetic unit 50 (process 74). The results of this signed-digit addition are available immediately on bus SMOUT via shifter/multiplexer 54, and are stored (process 76) by input select circuitry 55 into the sign bit and magnitude bit portions of register entry $R_2$ of register file 39 in cycle i, as indicated in the stage labeled WriteData(SD) of FIG. 5a. The binary results of this addition are not available yet, as the result of the addition are in signed-digit form and have not yet been converted by conversion circuitry 60; bus LBINTOUT is invalid at this time, and the valid bit V of register entry $R_2$ is cleared at the end of this cycle i. A copy of the signed-digit results are stored (process 77) in signed-digit result register 59 at this time, for later conversion into binary.

In the next cycle i+1 in the example of FIG. 5a, another addition is executed by ALU 42. The results of the prior instruction, stored in register entry $R_2$, and the contents of register entry $R_1$ are to be fetched, added to one another, and stored in register entry $R_3$. As noted above, the binary representation of the results of the prior instruction are not yet available for register entry $R_2$; however, since this next instruction is not a logical instruction, only the signed-digit representation of the results of the prior instruction is necessary, and is already available at this time. As such, in cycle i+1, signed-digit arithmetic unit 50 adds the fetched signed-digit portions of register entries $R_2$ and $R_1$ (process 74), the results of which are immediately available on bus SMOUT and are written into the sign bit and magnitude bit portions of destination register entry $R_3$ via input selection circuitry 55 of register file 39 (in process 76). The converted binary representation of register entry $R_2$ from the previous instruction becomes available on bus CBINOUT, due to the simultaneous operation of conversion circuitry 60 (process 80). This converted binary result is written into the binary portion of register file 39 in this cycle i+1 (process 82) as shown by the stage labeled WriteData(B) of FIG. 5a, and the valid bit V is set for this entry (process 84), as the contents of register entry $R_2$ were not disturbed by the instruction being performed in cycle i+1.

Similarly, another additive instruction using the results of the prior instruction is performed in the next cycle i+2 of the example of FIG. 5a; this instruction will fetch and add the contents of registers $R_2$ and $R_3$ (i.e., the results of the immediate two instructions), storing the results into register entry $R_4$. Since the signed-digit representation of the results of the prior instruction is available in register entry $R_3$ of register file 39, this addition may be executed by signed-digit arithmetic unit 50, the results of which are immediately available on bus SMOUT for storage in register entry $R_4$ of register file 39. In this cycle i+2, the converted binary representation of the results of the prior instruction ($R_2+R_1$) become available on bus CBINOUT, and are stored into the binary portion of register entry $R_3$ via input select circuitry 55 of register file 39. The valid bit V for register entry $R_3$ is then set.

As evident from the example of FIG. 5a, additive instructions may be executed and completed efficiently, one in each cycle, by ALU 42 using the signed-digit number representation for the operands as stored in register file 39, and in a carry-free manner as performed by signed-digit arithmetic unit 50. The generation of the binary representation of the results in a later cycle does not disturb the performance of the additive instructions, as the binary representations of the arithmetic results are not needed for the successive instructions.

FIG. 5b illustrates another example of a code fragment as executed by ALU 42. In this example, logical instructions are executed by binary logical unit 52. In first cycle i of this example, binary logical unit 52 is to execute the logical AND of the contents of register entries $R_0$, $R_1$, for storage in destination register $R_2$. Operand unit 44 first tests the valid bits V for these entries $R_0$, $R_1$ (decision 73) and, since both are valid, controls output select circuitry 53 to fetch the contents of the binary portions of register entries $R_0$, $R_1$ for application to binary logical unit 52 (process 85). The instruction is then executed by binary logical unit 52 to perform the desired logical AND (process 86). The binary representation of this operation becomes available immediately on bus LBINOUT, and is written into the binary portion of register entry $R_2$ by input select circuitry 55 (process 88); the valid bit V is set for register entry $R_2$ (process 90), under the control of flags information on flags bus FL, as the binary representation of these results is valid (having been generated by binary logical unit 52). The signed-digit representation of the result of the logical AND operation is also immediately available (in its trivial form, with all sign bits set to zero) on bus SMOUT, and is also stored in the sign bit and magnitude bit portions of register entry $R_2$ of register file 39 (process 88).

In cycle i+1, another logical operation is to be executed; in this case, the results of the prior operation (the contents of register entry $R_2$) are to be exclusive-ORed with an immediate operand (forwarded to ALU 42 via a temporary register in register file 39. In this case, the valid bit V corresponding to register entry $R_2$ (and also corresponding to the immediate operand) is tested by operand unit 44 to determine if the binary value stored in its corresponding entry is valid. In this case, valid bit V of register entry $R_2$ is set (the previous instruction being a binary operation), and the exclusive-OR operation is executed by binary logical unit 52. The binary results are again immediately available on bus LBINOUT (and in trivial signed-digit form on bus SMOUT), and are stored in register entry $R_3$ of register file 39. The valid bit V for the binary portion of register entry $R_3$ is set at this time, as the binary representation is valid.

In this example, the instruction to be executed in cycle i+2 is an additive arithmetic instruction, namely the subtraction of the contents of register entry $R_1$ from the contents of register entry $R_3$ (which is the result of the previous instruction). Since the signed-digit representations of these two operands are available, these operands are fetched (process 72) and presented to signed-digit arithmetic unit 50 of ALU 42. Upon execution (process 74), the result of the subtraction becomes available on bus SMOUT for storage in the sign bit and magnitude bit portions of register entry $R_4$ of register file 39; the binary representation of these results is, as before, not available at this time, but becomes available in the next cycle i+3 as shown in FIG. 5b. The valid bit V for register entry $R_4$ is therefore cleared in cycle i+2, and set in cycle i+3.

As evident from the example of FIG. 5b, ALU 42 can also efficiently perform sequences of instructions involving logical operations, and arithmetic operations upon the results of a previously executed logical operation. Referring now to FIG. 5c, another example of the operation of ALU 42 according to this embodiment of the invention will now be described, illustrating the case where the pipeline stalls in order to complete the conversion of results into binary.

In cycle i of the example of FIG. 5c, an additive arithmetic instruction is performed, in which the contents of register entries $R_1$, $R_0$ are fetched and added to one another, with the result immediately available for storage, in its signed-digit form, in the sign bit and magnitude bit portions of register entry $R_2$, as described hereinabove relative to FIG. 5a. The binary representation of these results are not yet available, however, as conversion by conversion circuitry 60 is to be performed in the next cycle i+1, as described above. As such, the value on bus LBINOUT is invalid in cycle i, and valid bit V for the binary portion of register entry $R_2$ is cleared at this time.

In this example, however, the instruction to be executed in cycle i+1 is a logical instruction upon the results of the previous arithmetic operation; in this case, the instruction is the logical AND of the results of the prior instruction (which were to be stored in register entry $R_2$) and the contents of register entry $R_4$. Prior to fetching these operands, operand unit 44 interrogates valid bits V of each of the operand register entries $R_2$, $R_4$ (decision 73). Because valid bit V for the binary portion of register entry $R_2$ was cleared in the prior cycle because the results from the prior instruction were not yet available from conversion circuitry 60, operand unit 44 stalls the pipeline for ALU 42 (process 78). Accordingly, the logical instruction is not executed by binary logical unit 50 in cycle i+1; instead, only the conversion of the signed-digit results from the prior instruction into binary form (process 80), and the storage of these results via bus CBINOUT (process 82), are performed in this cycle. The binary portion of register entry $R_2$ receives the converted results from bus CBINOUT, and the valid bit V for this entry is then set in cycle i+1 (process 84). In cycle i+2, operand unit 44 again interrogates valid bit V of the operands and, upon detecting that valid bit V for register entry $R_2$ is now set, fetches the operands from the binary portions of register file 39 (process 85) and initiates the execution of the logical AND instruction by binary logical unit 50 (process 86). The binary results of this instruction become immediately available, and are stored in the binary, sign bit, and magnitude bit portions of register entry $R_3$, as indicated in FIG. 5c.

As described relative to FIG. 5c, pipeline stalls can occur in ALU 42 according to this preferred embodiment of the invention in the event of a logical instruction to be performed upon the results of an immediately preceding arithmetic instruction. However, it has been discovered, in connection with the present invention, that this combination of instructions is relatively rare in modern microprocessor programs. It is therefore contemplated that the performance improvement provided by the present invention will far outweigh the effects of stalls due to signed-digit to binary conversion, especially when considering overall microprocessor performance.

Figure 2B:
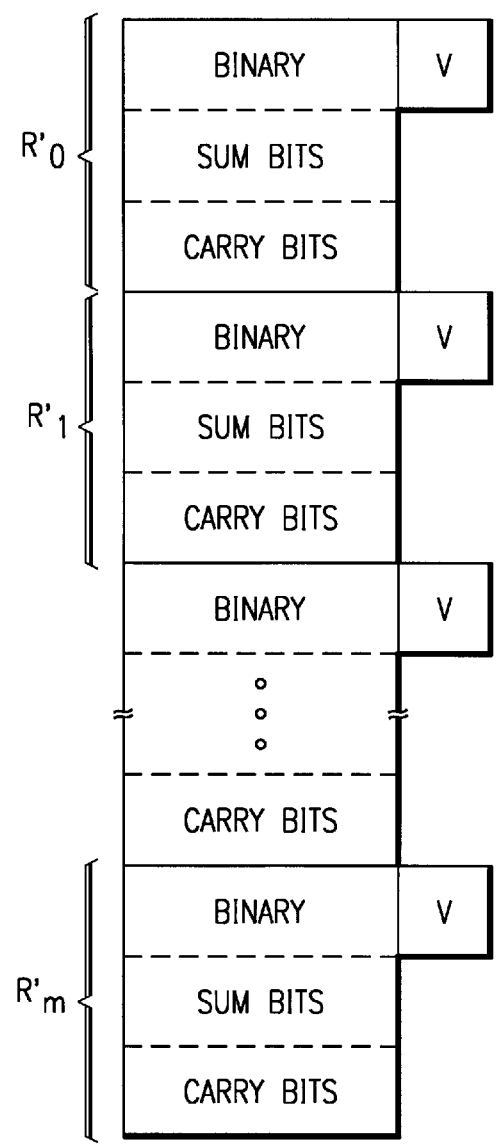
FIG. 2b is a diagram illustrating the contents of a register file according to the second preferred embodiment of the invention.

As evident from the foregoing, the above description was provided for the example where the operands are maintained in both a binary and a redundant representation, where the redundant representation is of the signed-digit, or signed-magnitude, form. The term "carry-free" in this context refers to the ability to perform arithmetic operations, such as additions and subtractions, without requiring the propagation of carry information along the entire operand length; rather, as in the case of the signed-digit implementation described hereinabove, intermediate information need only be communicated to a single adjacent stage in the adder, for example as shown in the above-incorporated U.S. Pat. No. 4,890,127. The redundant signed-digit number representation described hereinabove is provided by way of example only, as other redundant number representations may alternatively be used. Referring now to FIG. 2b, the organization of entries R' in register file 39' utilizing an alternative redundant number representation will now be described.

In FIG. 2b, register file 39' is illustrated as having multiple register entries $R'_0$ through $R'_m$, as in the case of FIG. 2a described hereinabove. As before, each entry R' includes a binary portion, for storing an n-bit binary representation of a digital operand (which may have its most significant bit as a sign bit for the entire operand); valid bit V is associated with this binary portion of each entry R' to indicate whether the contents of the binary portion of the entry R' is valid. According to this embodiment of the invention, the number represented in binary form in the binary portion of each entry R' is also stored in a carry-sum format, for use by a carry save adder. As is known in the art, the carry-sum number representation provides a carry bit and a sum bit (i.e., a partial sum bit) for each bit position in the operand. According to this embodiment of the invention, therefore, each entry R' in register file 39' has a carry bit portion and a sum bit portion, together storing the number represented in the corresponding binary portion of register entry R' in carry-save form.

Figure 6:
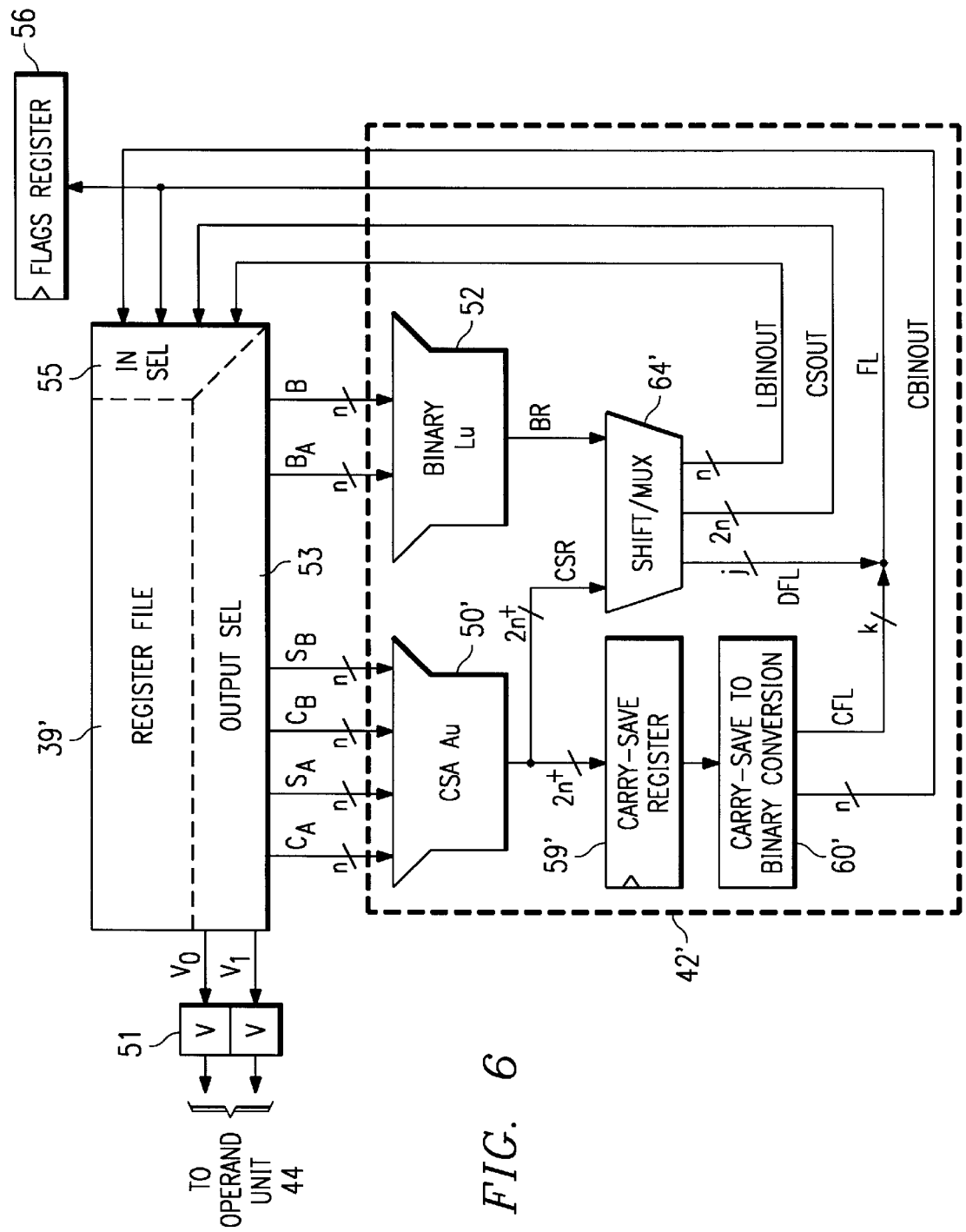
FIG. 6 is an electrical diagram, in block form, of an arithmetic logic unit according to the second preferred embodiment of the invention.

Referring now to FIG. 6, the construction of ALU 42' according to this alternative embodiment of the invention will now be described in detail. ALU 42' is constructed similarly as ALU 42 described hereinabove relative to FIG. 3; common elements between the two embodiments are referred to by the same reference numerals. As before, binary logical unit 52 performs logical operations upon binary representations of the operands forwarded thereto from register file 39', and presents its binary results on bus BR to shifter/multiplexer 64'. In this embodiment of the invention, shifter/multiplexer 64' presents the results of logical operations in binary form on bus LBINOUT, and as a carry-sum representation on bus CSOUT; the carry-sum representation may be trivially generated from the binary result merely by copying the binary representation to the sum bits and setting all carry bits to zero.

In contrast to ALU 42, however, ALU 42' includes carry-save arithmetic unit 50' for performing arithmetic operations upon the carry-save representations of operands stored in register file 39' as described above relative to FIG. 2b. As such, carry-save arithmetic unit 50' includes conventional circuitry, such as a carry-save adder, for performing additive instructions (i.e., addition and subtraction) in a carry-free manner, as is known in the art. The results generated by ALU 42' are presented to shifter/multiplexer 64' for writeback to register file 39' on bus CSOUT, and a copy is stored by carry-sum result register 59'. Conversion circuitry 60' is provided to convert the carry-sum representation of the arithmetic results into binary, in the next cycle; the results of this conversion is then communicated to register file 39' via bus CBINOUT.

As indicated in the foregoing description of ALU 42', its operation is similar to that of ALU 42 as described relative to FIGS. 4 and 5a through 5c, except that the redundant number representation differs from the signed-digit case. As in the first preferred embodiment, ALU 42' also provides efficiency in the execution of many sequences of arithmetic and logical instructions, as the logical instructions may be performed directly upon the binary operand representations, while the arithmetic instructions may be performed upon the carry-sum operand representations and the results thereof stored in the same form, without requiring the propagation of carry information along the length of the operands.

It is contemplated that, based on the foregoing description, one of ordinary skill in the art will be able to apply the present invention to number representations, and execution units, of other forms, while still retaining the ability to rapidly perform logical operations upon binary representations of the operands. In each case, significant efficiencies in ALU performance may be obtained as time-consuming format conversion into binary is done in later cycles. Pipeline stalls are minimized, considering the rarity of logical operations on the results of an immediately preceding arithmetic operation.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

I claim:

1. A microprocessor, comprising:
    a register file, having a plurality of entries, each entry having a binary portion for storing an operand in a binary form, and having a redundant portion for storing the operand in a redundant form; and
    an arithmetic logic unit, coupled to the register file, for executing arithmetic and logical instructions upon operands stored in the register file, comprising:
        a binary logical unit, for receiving operands in the binary form from selected entries in the register file, and for executing a logical operation thereupon;
        a redundant arithmetic unit, for receiving operands in the redundant form from selected entries in the register file, and for executing an arithmetic operation thereupon;
        a select circuit, having inputs coupled to outputs of the binary logical unit and the redundant arithmetic unit, and having an output coupled to the register file, for forwarding results of the logical operation from the binary logical unit to the register file in both the binary form and in the redundant form, and for forwarding results of the arithmetic operation from the redundant arithmetic unit to the register file in the redundant form; and
        a conversion circuit, having an input coupled to the redundant arithmetic unit and having an output coupled to the register file, for converting results of the arithmetic operation from the redundant form into the binary form, and for forwarding the converted results of the arithmetic operation to the register file.

2. The microprocessor of claim 1, wherein the register file includes a valid bit associated with the binary portion of each entry, the valid bit indicating when set that a value stored in the binary portion of the entry corresponds to a value stored in the redundant portion of the entry.

3. The microprocessor of claim 2, wherein the select circuit presents the results of the arithmetic operation from the redundant arithmetic unit to a destination entry in the register file;
    and wherein the select circuit is also for presenting a clear signal to the register file to clear the valid bit of the destination entry when presenting the results of the arithmetic operation in redundant form.

4. The microprocessor of claim 3, wherein the select circuit presents the results of the logical operation from the binary logical unit to the destination entry in the register file;
    and wherein the select circuit is also for presenting a set signal to the register file to set the valid bit of the destination entry when presenting the results of the logical operation in binary form.

5. The microprocessor of claim 4, further comprising:
    control circuitry, for decoding instructions and for controlling the arithmetic logic unit responsive to the decoded instructions.

6. The microprocessor of claim 5, wherein the control circuitry is coupled to the register file to receive the valid bits from selected entries corresponding to source registers therein, and wherein the control circuitry is for stalling the arithmetic logic unit responsive to either of the received valid bits being clear.

7. The microprocessor of claim 4, wherein the conversion circuitry presents the converted results of the arithmetic operation to a destination entry in the register file;
    and wherein the conversion circuitry is also for presenting a set signal to the register file to set the valid bit of the destination entry when presenting the converted results of the arithmetic operation in binary form.

8. The microprocessor of claim 1, wherein the redundant representation corresponds to a signed-digit number representation;
    and wherein the redundant portion of each of the plurality of entries in the register file comprises a sign bit portion and a magnitude bit portion.

9. The microprocessor of claim 8, wherein the redundant arithmetic unit comprises a signed-digit adder.

10. The microprocessor of claim 1, wherein the redundant representation corresponds to a carry-sum number representation;
    and wherein the redundant portion of each of the plurality of entries in the register file comprises a sum portion and a carry portion.

11. The microprocessor of claim 10, wherein the redundant arithmetic unit comprises a carry-save adder.

12. A method of operating an arithmetic logic unit in a microprocessor, comprising the steps of:
    decoding a first instruction;
    responsive to the first instruction corresponding to an arithmetic operation:
        fetching operands in a redundant representation from a register file, each entry of the register file having a binary portion for storing an operand in a binary representation and a redundant portion for storing the operand in the redundant representation;
        executing the arithmetic operation of the first instruction upon the fetched operands with an arithmetic unit to produce a result in the redundant representation;
        forwarding the result of the first instruction in the redundant representation to the redundant portion of a destination entry in the register file; and
        converting the result of the first instruction in the redundant representation into a binary representation; and
    responsive to the first instruction corresponding to a logical operation:
        fetching operands in the binary representation from the register file;
        executing the logical operation of the first instruction upon the fetched operands with a binary logical unit to produce a result in the binary representation; and
        forwarding the result of the first instruction to the binary portion and to the redundant portion of a destination entry in the register file.

13. The method of claim 12, further comprising:

responsive to the first instruction corresponding to an arithmetic operation, clearing the valid bit associated with the binary portion of the destination entry in the register file in combination with the step of forwarding the result of the first instruction in the redundant representation to the redundant portion of a destination entry; and responsive to the first instruction corresponding to a logical operation, setting a valid bit associated with the binary portion of the destination entry in the register file in combination with the step of forwarding the result of the first instruction to the binary portion of the destination entry in the register file.

14. The method of claim 13, further comprising, after the step of converting the result of the first instruction in the redundant representation into a binary representation:

forwarding the converted result to the binary portion of the destination register; and setting the valid bit associated with the binary portion of the destination entry.

15. The method of claim 14, further comprising:

decoding a second instruction; and responsive to the second instruction corresponding to a logical operation, testing the valid bit of each entry in the register file corresponding to an operand of the second instruction;

responsive to any of the tested valid bits not being set:
then converting the result of the first instruction in the redundant representation into a binary representation;
forwarding the converted result of the first instruction to the binary portion of the destination register; and
setting the valid bit associated with the binary portion of the destination entry; and responsive to each of the tested valid bits being set:
fetching operands in a binary representation from the register file;
executing the logical operation of the second instruction upon the fetched operands with a binary logical unit to produce a result in the binary representation;
forwarding the result of the second instruction to the binary portion and to the redundant portion of a destination entry in the register file; and
setting the valid bit associated with the binary portion of the destination entry.

16. The method of claim 12, further comprising:

decoding a second instruction;

responsive to the second instruction corresponding to an arithmetic operation:
fetching operands in the redundant representation from a register file;
executing the arithmetic operation of the second instruction upon the fetched operands with the arithmetic unit to produce a result in the redundant representation; and
forwarding the result of the second instruction in the redundant representation to the redundant portion of a destination entry in the register file;

wherein the step of converting the result of the first instruction is performed in parallel with the step of executing the arithmetic operation of the second instruction.

17. The method of claim 12, wherein the redundant representation is a signed-digit number representation;

and wherein the step of executing the arithmetic operation comprises operating a signed-digit adder upon operands in the signed-digit number representation to produce a result in the signed-digit number representation.

18. The method of claim 12, wherein the redundant representation is a carry-sum number representation;

and wherein the step of executing the arithmetic operation comprises operating a carry-save adder upon operands in the carry-sum number representation to produce a result in the carry-sum number representation.

19. The method of claim 12, wherein the arithmetic operation is an additive arithmetic operation.

* * * * *